US012634406B2

(12) United States Patent
Ono

(10) Patent No.: US 12,634,406 B2
(45) Date of Patent: May 19, 2026

(54) INFORMATION PROCESSING DEVICE AND METHOD, IMAGE FORMING APPARATUS, AND NON-TRANSITORY COMPUTER READABLE MEDIUM

(71) Applicant: FUJIFILM BUSINESS INNOVATION CORP., Tokyo (JP)

(72) Inventor: Mitsuoki Ono, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/182,668

(22) Filed: Mar. 13, 2023

(65) Prior Publication Data

US 2024/0089397 A1 Mar. 14, 2024

(30) Foreign Application Priority Data

Sep. 13, 2022 (JP) ................................. 2022-145651

(51) Int. Cl.
| | |
|---|---|
| *H04N 1/60* | (2006.01) |
| *G06F 3/14* | (2006.01) |
| *G06T 7/50* | (2017.01) |
| *G06V 10/56* | (2022.01) |
| *G06V 10/74* | (2022.01) |

(52) U.S. Cl.
CPC ................. *H04N 1/60* (2013.01); *G06F 3/14* (2013.01); *G06T 7/50* (2017.01); *G06V 10/56* (2022.01); *G06V 10/761* (2022.01); *G06T 2207/10024* (2013.01)

(58) Field of Classification Search
CPC .... H04N 1/60; H04N 1/54; G06F 3/14; G06T 7/50; G06T 2207/10024; G06V 10/56; G06V 10/761; G06V 10/255; G06V 10/422; G09G 5/02; G09G 2320/0686; G09G 2354/00
USPC .......................................... 382/518; 358/518
See application file for complete search history.

(56) References Cited

U.S. PATENT DOCUMENTS

2005/0157346 A1* 7/2005 Kitagawara .............. H04N 1/62
358/518

FOREIGN PATENT DOCUMENTS

| | | |
|---|---|---|
| JP | 2009-130461 A | 6/2009 |
| JP | 2017149100 A * | 8/2017 |

* cited by examiner

*Primary Examiner* — Charlotte M Baker
(74) *Attorney, Agent, or Firm* — OLIFF PLC

(57) ABSTRACT

An information processing device includes at least one processor configured to: refer to a spot color setting information, the spot color setting information being information generated by registering a shape of an object and a predetermined spot color in association with each other; replace, if a shape of an object indicated by image data included in a print job matches a shape of an object registered in the spot color setting information, a color of the object indicated by the image data by a spot color associated with the matched shape of the object registered in the spot color setting information; and output print data reflecting the spot color of the object indicated by the image data.

19 Claims, 5 Drawing Sheets

INFORMATION PROCESSING DEVICE AND METHOD, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-145651 filed Sep. 13, 2022.

BACKGROUND

(i) Technical Field

The present disclosure relates to an information processing device and method, an image forming apparatus, and a non-transitory computer readable medium.

(ii) Related Art

Japanese Unexamined Patent Application Publication No. 2009-130461 discloses an image processing apparatus that generates a preview image to be used for forming an image on a recording medium by an image forming device. The image processing apparatus includes a spectral reflectance obtainer, a medium image obtainer, an image data input unit, a condition input unit, a selector, and a generator. The spectral reflectance obtainer obtains information on the spectral reflectance of each of a color patch and a region of the recording medium where an image is not formed. The color patch corresponds to at least three colors and is formed on the recording medium with a recording agent used by the image forming device. The medium image obtainer obtains plural grayscale images. The grayscale images are generated by imaging the recording medium where an image is not formed while changing the relative positional relationship between the incident direction of illumination and the imaging direction. The image data input unit inputs image data of an image to be formed on the recording medium. The condition input unit receives input of an illumination condition and an observation condition used for generating a preview image. The selector selects one of the plural grayscale images, based on the input illumination condition and observation condition. The generator generates a preview image by sequentially determining a pixel value for each of positions of the selected grayscale image by using the color of the image to be formed by using the image data and the information on the spectral reflectance.

SUMMARY

When creating and editing image data by using an application, for example, if objects indicated by this image data include objects to be printed with a spot color other than standard colors, a user is required to set a spot color for these objects one by one. This is time- and effort-consuming for the user and the user may inadvertently omit to set a spot color.

Aspects of non-limiting embodiments of the present disclosure relate to an information processing device and method, an image forming apparatus, and a non-transitory computer readable medium that enable a user to efficiently set a spot color for an object to be subjected to spot color printing, compared with the configuration in which a user is required to set a spot color for an object indicated by image data for each print job.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including at least one processor configured to: refer to a spot color setting information, the spot color setting information being information generated by registering a shape of an object and a predetermined spot color in association with each other; replace, if a shape of an object indicated by image data included in a print job matches a shape of an object registered in the spot color setting information, a color of the object indicated by the image data by a spot color associated with the matched shape of the object registered in the spot color setting information; and output print data reflecting the spot color of the object indicated by the image data.

BRIEF DESCRIPTION OF THE DRAWINGS

An exemplary embodiment of the present disclosure will be described in detail based on the following figures, wherein.

DETAILED DESCRIPTION

Figure 1:
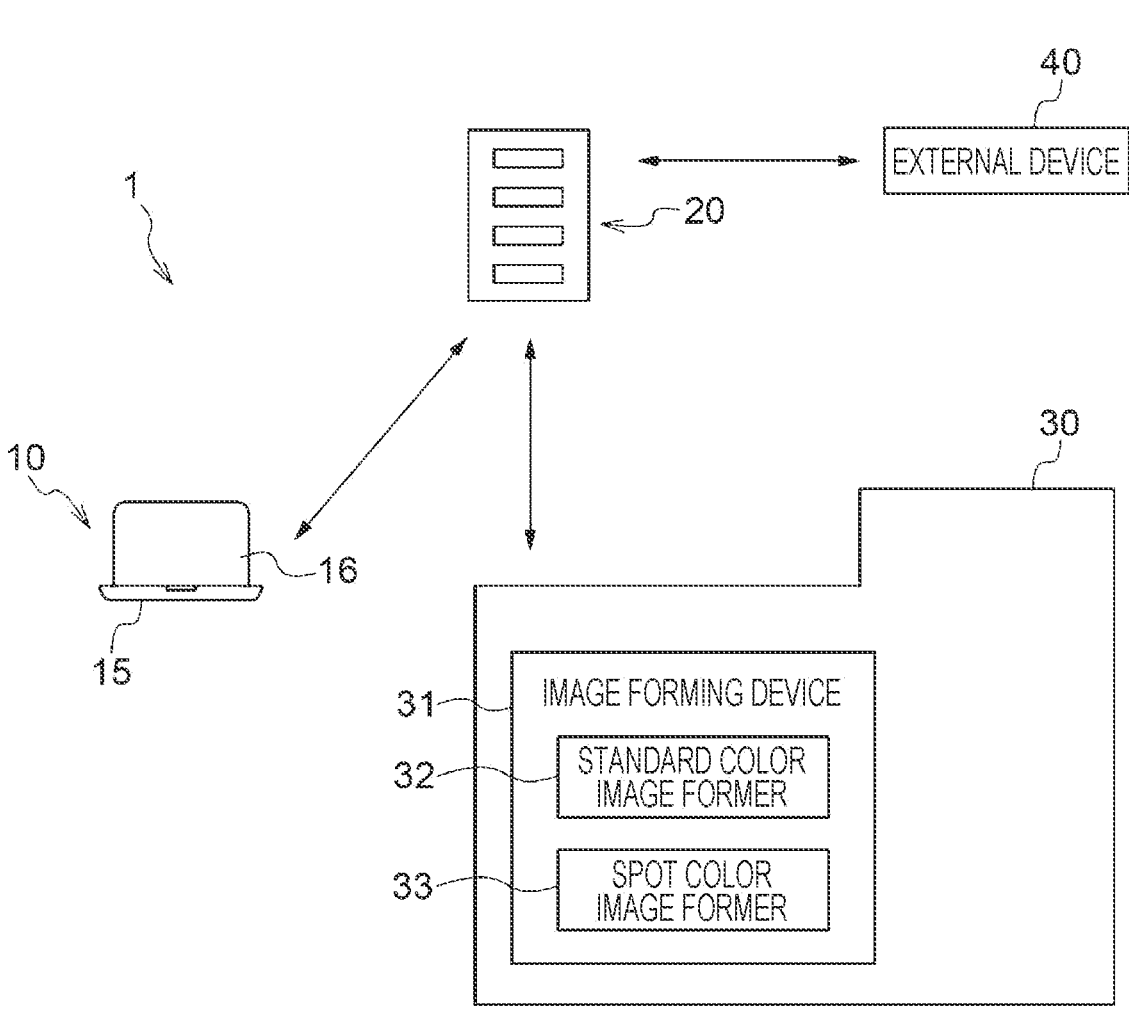
FIG. 1 is a schematic diagram of an information processing system including a user terminal of the exemplary embodiment.

An exemplary embodiment of the disclosure will be described below with reference to the accompanying drawings. In the individual drawings, identical or equivalent elements or portions are designated by like reference numeral. For the sake of representation, the dimensional ratios in the drawings are exaggerated and may be different from the actual ratios.

Exemplary Embodiment

FIG. 1 is a schematic diagram of an information processing system including a user terminal of an exemplary embodiment.

As illustrated in FIG. 1, an information processing system 1 includes a user terminal 10, which is an example of an information processing device, a server 20, a printer 30, which is an example of an image forming apparatus, and an external device 40. In the information processing system 1, the user terminal 10, server 20, printer 30, and external device 40 connect to each other via the internet or a wired or a wireless network. In one example, in the information processing system 1 shown in FIG. 1, the user terminal 10, server 20, printer 30, and external device 40 connect to each other via a wireless network.

The user terminal 10 is a device that creates image data, provides an instruction to print image data, and manages objects indicated by image data included in a print job, for example. In one example, the user terminal 10 provides a print instruction by sending a print job including print data corresponding to image data to the server 20.

In a storage 14 (see FIG. 2) of the user terminal 10, a first spot color setting information 101A (see FIG. 3), which is generated by registering the shape of an object and a predetermined spot color in association with each other, is stored. The user terminal 10 refers to the first spot color setting information 101A. If the shape of an object indicated by image data included in a print job matches the shape of an object registered in the first spot color setting information 101A, the user terminal 10 replaces the color of the object indicated by the image data by the spot color associated with the matched shape of the object registered in the first spot color setting information 101A and creates print data reflecting the spot color of the object indicated by the image data. In the specification, if the shape of one object matches the shape of another object, it means that the shapes of the two objects are the same or similar to each other. If the shapes of two objects are similar to each other, they are congruent having equal scale factors. For example, if the shapes of two objects are rectangular and the difference in the aspect ratio between the shapes of the two objects is within ±5%, the shapes of the two objects match each other. Processing for replacing the color of an object indicated by image data by a spot color and creating print data reflecting the spot color of the object will be discussed later.

Figure 2:
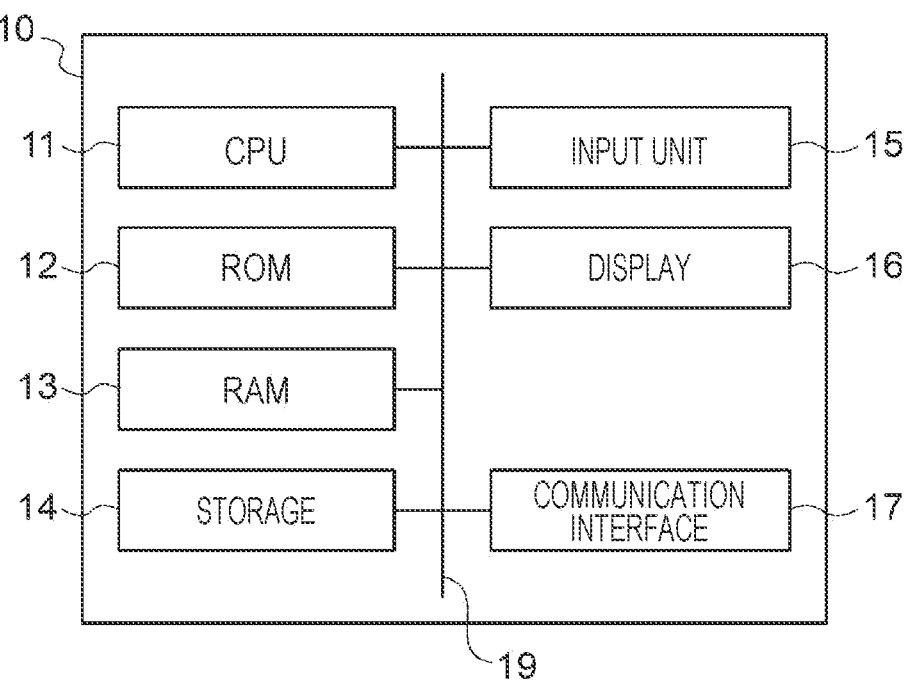
FIG. 2 is a block diagram of the hardware configuration of the user terminal.

The user terminal 10 includes an input unit 15 and a display 16 (see FIG. 2). The display 16 displays image data, for example. The display 16 also displays a check screen for checking with a user regarding whether to replace the color of an object indicated by image data included in a print job by a spot color. With the use of the input unit 15, image data is created and an instruction to print image data is input, for example. On the check screen displayed on the display 16, for example, a user can use the input unit 15 to perform an input operation for replacing the color of an object indicated by image data by a spot color or an input operation for not replacing the color of an object indicated by image data by a sport color.

The server 20 is a relay device that causes the printer 30 to perform printing in accordance with a print instruction received from the user terminal 10. In one example, the server 20 receives a print job including print data from the user terminal 10 and sends the print job to the printer 30.

The printer 30 is an apparatus that performs printing on a recording medium in accordance with a print instruction received from the user terminal 10. The printer 30 receives a print job from the server 20 and forms an image corresponding to print data included in the print job on a recording medium.

The printer 30 includes an image forming device 31. The printer 30 drives the image forming device 31 to form an image corresponding to print data on a recording medium. The image forming device 31 includes a standard color image former 32 and a spot color image former 33. The standard color image former 32 forms an image by using four standard colors, namely, cyan, magenta, yellow, and black. The spot color image former 33 forms an image by using a spot color. The spot color is a specially created color, which is other than cyan, magenta, yellow, and black.

Examples of the spot color are gold, silver, and fluorescent colors. The printer 30 is able to form an image with one or more spot colors by using the spot color image former 33. If a spot color can be expressed by the four standard colors, namely, cyan, magenta, yellow, and black, an image may be formed by such standard colors using predetermined color components.

In one example, the printer 30 forms an image corresponding to print data on a recording medium according to an electrophotographic system. The printer 30 includes an image forming unit as the image forming device 31. In this case, the standard color image former 32 forms standard color toner images, while the spot color image former 33 forms spot color toner images. The image forming device 31 also includes a transfer unit that transfers a toner image to a recording medium and a fixing unit that fixes a toner image transferred to a recording medium on the recording medium. The printer 30 may form an image corresponding to print data on a recording medium according to an inkjet system instead of the electrophotographic system.

In the external device 40, a second spot color setting information 141 (see FIG. 3), which is generated by registering the shape of an object and a predetermined spot color in association with each other, is stored. The second spot color setting information 141 is an example of spot color setting information. The second spot color setting information 141 includes a different type of information representing the association between the shape of an object and a spot color from the first spot color setting information 101A prestored in the user terminal 10. The user terminal 10 can obtain the second spot color setting information 141, which is not stored in the user terminal 10, by communicating with the external device 40 via the server 20.

FIG. 2 is a block diagram of the hardware configuration of the user terminal 10.

As illustrated in FIG. 2, the user terminal 10 includes a central processing unit (CPU) 11, a read only memory (ROM) 12, a random access memory (RAM) 13, a storage 14, an input unit 15, a display 16, and a communication interface 17. These elements are connected to each other via a bus 19 so that they can communicate with each other.

The CPU 11 executes various programs and controls the individual elements of the user terminal 10. The CPU 11 is an example of a processor. That is, the CPU 11 reads a program from the ROM 12 or the storage 14 and executes the program by using the RAM 13 as a work area. The CPU 11 controls the elements of the user terminal 10 and executes computing operations in accordance with programs stored in the ROM 12 or the storage 14. In the exemplary embodiment of the disclosure, an information processing program is stored in the ROM 12 or the storage 14.

In the ROM 12, various programs and various items of data are stored. The RAM 13 is used as a work area for temporarily storing a program or data. The storage 14 is constituted by a hard disk drive (HDD) or a solid state drive (SSD), and stores various programs including an operating system (OS) and various items of data. In the storage 14, a printer driver program is stored. The CPU 11 reads the printer driver program from the storage 14 and executes it so as to function as a printer driver. The RAM 13 and the storage 14 are examples of a memory.

The display 16 is a liquid crystal display, for example, and displays various types of information. The input unit 15 includes a pointing device, such as a mouse, and a keyboard, and is used for various input operations. The input unit 15 may alternatively form part of a touchscreen.

The communication interface 17 is used for communicating with other devices, such as the server 20. Ethernet (registered trademark), fiber distributed data interface (FDDI), or Wi-Fi (registered trademark), for example, is used as the standard of the communication interface 17.

Figure 3:
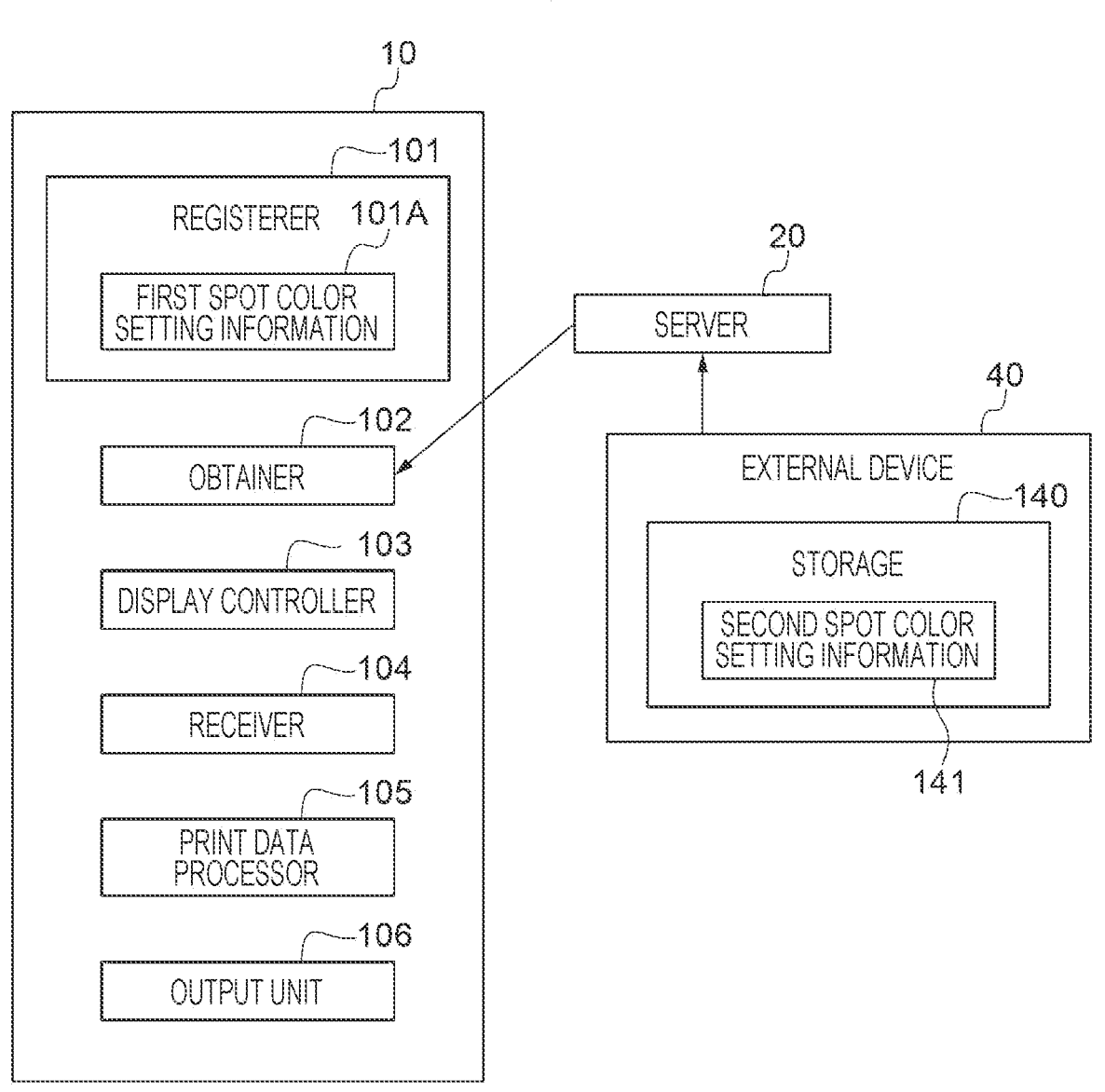
FIG. 3 is a block diagram illustrating an example of the functional configuration of the user terminal.

FIG. 3 is a block diagram illustrating an example of the functional configuration of the user terminal 10.

As illustrated in FIG. 3, the user terminal 10 includes a registerer 101, an obtainer 102, a display controller 103, a receiver 104, a print data processor 105, and an output unit 106 as functional modules. These functional modules are implemented as a result of the CPU 11 reading the information processing program stored in the ROM 12 or the storage 14, loading it to the RAM 13, and executing it.

The registerer 101 has a function of registering the first spot color setting information 101A therein. The first spot color setting information 101A is an example of the spot color setting information. The first spot color setting information 101A is stored in the storage 14, for example. An example of the shape of an object registered in the first spot color setting information 101A is a shape selected from the shapes of national flags and company logomarks. In the registerer 101, predetermined items of first spot color setting information 101A are prestored. The national flag is a flag representing the symbol of a country or an emblem representing a country. The company is a legal entity which engages in or operates commercial or other types of profit-making business. Examples of the company are a corporation (company limited), a limited partnership company, and a limited liability company based on the company acts of a country. The company logomark is a mark indicating the name of a company, for example, with a unique character style or design. A simple symbol mark and a trademark are also examples of the company logomark.

When a spot color is set for an object whose shape is not registered in the first spot color setting information 101A, the registerer 101 associates the shape of this object with the set spot color and registers them in the first spot color setting information 101A. For example, when the second spot color setting information 141 is obtained by the obtainer 102, which will be discussed later, from the external device 40 and when a spot color indicated by the second spot color setting information 141 is set for an object, the registerer 101 associates the shape of this object with the set spot color and registers them in the first spot color setting information 101A.

The obtainer 102 has a function of obtaining the second spot color setting information 141, which indicates the shape of an object and a predetermined spot color in association with each other, by performing external communication. For example, the external device 40 includes a storage 140 and the storage 140 stores the second spot color setting information 141. The user terminal 10 obtains the second spot color setting information 141 from the external device 40 via the server 20. The second spot color setting information 141 obtained by the obtainer 102 is registered in the registerer 101 under a preset condition. Registering of the second spot color setting information 141 will be discussed later.

The display controller 103 has a function of controlling a screen to be displayed on the display 16. The display controller 103 displays on the display 16 a check screen for checking with a user regarding whether to replace the color of an object indicated by image data by a spot color associated with the shape of a corresponding object registered in the first spot color setting information 101A or the second spot color setting information 141. The check screen is an example of a screen for receiving an input operation indicating whether to replace the color of an object indicated by image data by a spot color. In one example, the display controller 103 displays the check screen on the display 16 before the output unit 106 outputs print data to the server 20.

Figure 4:
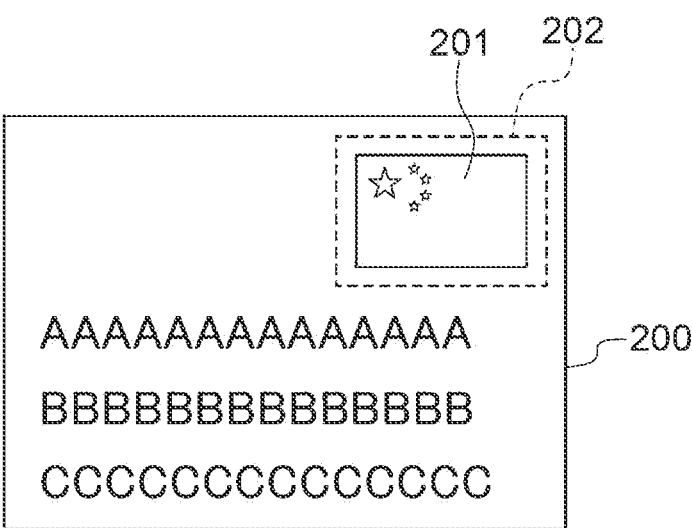
FIG. 4 illustrates an example of print data corresponding to image data indicating that the color of an object is replaced by a spot color.

FIG. 4 illustrates image data 200, which is an example of image data included in a print job. The image data 200 is displayed on the display 16, for example. As illustrated in FIG. 4, the shape of an object 201 indicated by the image data 200 matches the shape of a flag, which is one of the shapes registered in the first spot color setting information 101A. If the shape of the object 201 matches the shape of an object registered in the first spot color setting information 101A, the display controller 103 displays on the display 16 the check screen for checking whether to replace the color of the object 201 by the corresponding spot color. Displaying the check screen on the display 16 can check with a user whether to replace the color of the object 201 by the corresponding spot color. On the check screen, for example, the object 201 is surrounded by a FIG. 202 defined by the broken lines. On the check screen, the object 201 and the spot color which replaces the color of the object 201 are displayed on the display 16. As the spot color, information of the color number of the spot color may be displayed.

The receiver 104 receives an input operation indicating whether to replace the color of the object 201 indicated by the image data 200 by the spot color associated with the shape of the corresponding object registered in the first spot color setting information 101A. The above-described check screen is displayed on the display 16, and the user uses the input unit 15 to input information representing whether to replace the color of the object 201 indicated by the image data 200 by the spot color. In one example, the receiver 104 receives an input operation indicating that the color of the object 201 is to be replaced by the spot color (that is, the spot color is set for the color of the object 201) or an input operation indicating that the color of the object 201 is not to be replaced by the spot color (that is, the spot color is not set for the color of the object 201).

The print data processor 105 has a function of processing print data. If the receiver 104 has received the input operation for replacing the color of the object 201 by the corresponding spot color, the print data processor 105 replaces the color of the object 201 by the spot color associated with the shape of the corresponding object registered in the first spot color setting information 101A and creates print data reflecting the spot color of the object 201.

If the receiver 104 has received the input operation for not replacing the color of the object 201 by the corresponding spot color, the print data processor 105 maintains the color of the object 201 to be a preset standard color and creates print data reflecting the standard color of the object 201.

The output unit 106 has a function of outputting print data to the server 20. In one example, the output unit 106 outputs a print job including print data to the server 20. The print data is data processed by the print data processor 105. The print job including the print data is received by the server 20 and is further output from the server 20 to the printer 30. As a result, the printer 30 can form an image corresponding to the print data on a recording medium.

The operation of the user terminal 10 of the exemplary embodiment will now be described below.

Figure 5:
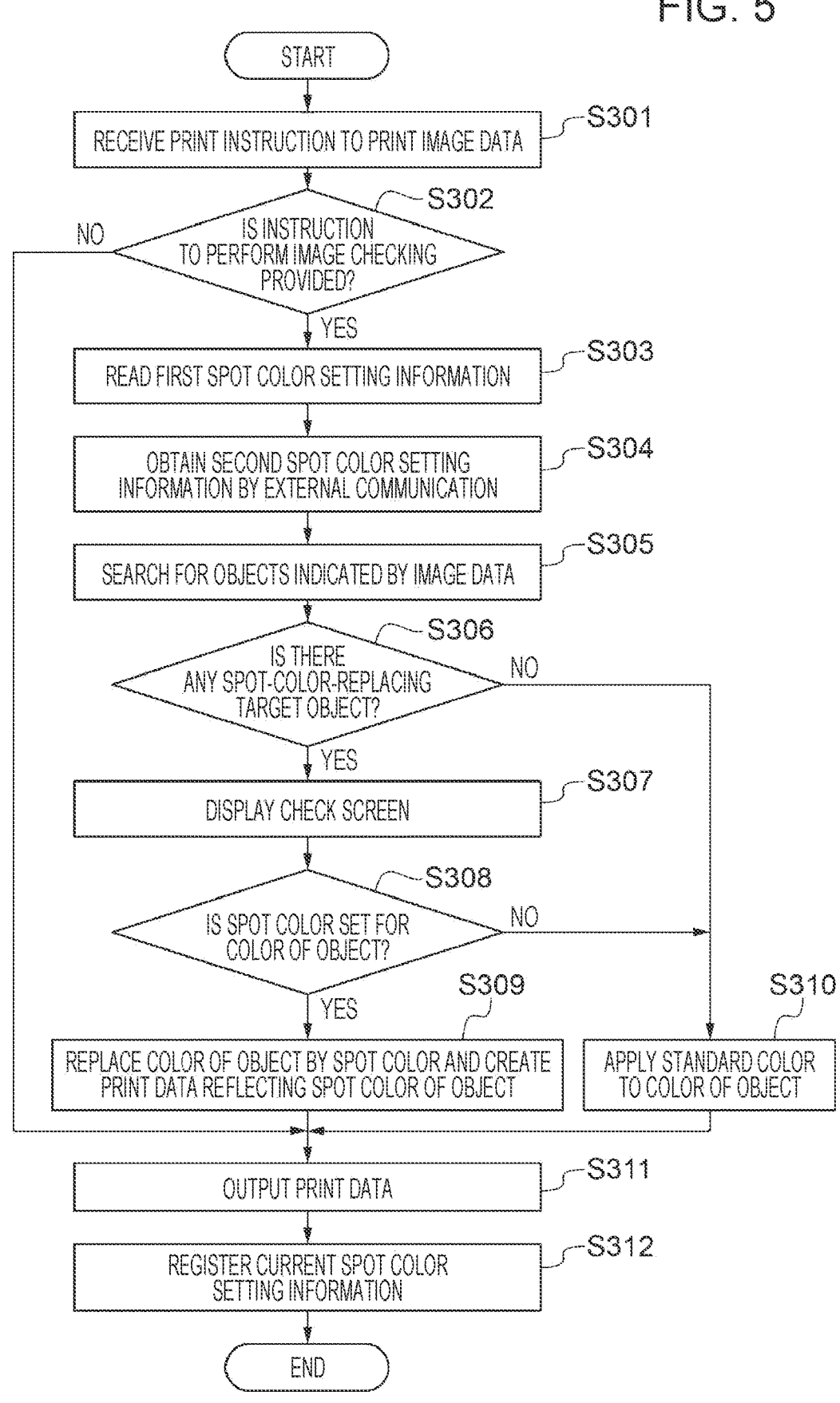
FIG. 5 is a flowchart illustrating a procedure of information processing executed by the user terminal of the exemplary embodiment.

FIG. 5 is a flowchart illustrating a procedure of information processing executed by the user terminal 10. The information processing can be executed as a result of the CPU 11 reading the information processing program from the ROM 12 or the storage 14, loading it to the RAM 13, and executing it.

Prior to the execution of the information processing shown in FIG. 5, a user first creates or reads the image data 200 (see FIG. 4) by using the user terminal 10. The information processing in FIG. 5 is executed when the user wants to print the image data 200 by using the printer 30, that is, to form an image corresponding to the image data 200 on a recording medium. The user selects the image data 200 and inputs print settings and a print instruction for printing the image data 200 by using the input unit 15 of the user terminal 10.

In response to the user selecting the image data 200 and inputting the print settings and print instruction, the CPU 11 receives this print instruction in step S301. In one example, upon receiving the print instruction to print the image data 200, the CPU 11 creates a print job for causing the printer 30 to print the image data 200. The print job includes the image data 200 and print setting information, for example. The print setting information indicates a color setting for each page and postprocessing, for example.

In step S302, the CPU 11 judges whether an instruction to check the image indicated by the image data 200 is provided. Hereinafter, this type of checking will be called image checking. The image checking is processing for checking whether the shape of an object indicated by image data, such as the shape of the object 201 indicated by the image data 200, matches the shape of an object registered in the first spot color setting information 101A or the second spot color setting information 141.

In one example, the user inputs an instruction to perform image checking for the image data 200 or an instruction not to perform image checking for the image data 200 by using the input unit 15. If a predetermined time has elapsed without the user inputting an instruction to perform image checking with the use of the input unit 15, the CPU 11 may determine that the user has not provided an instruction to perform image checking for the image data 200. In the exemplary embodiment, if it is obvious that there is no object whose color is to be replaced by a spot color in the image data 200, the user can provide an instruction not to perform image checking for the image data 200.

If an instruction to perform image checking is provided (YES in step S302), the CPU 11 reads the first spot color setting information 101A in step S303. As stated above, the first spot color setting information 101A is information generated by registering the shape of an object, such as the object 201, and a predetermined spot color in association with each other, and is stored in the storage 14, for example.

If an instruction to perform image checking is not provided (NO in step S302), the CPU 11 determines that the image data 200 is to be printed as in the print settings and outputs print data reflecting these print settings in step S311.

After step S303, in step S304, the CPU 11 obtains the second spot color setting information 141, whose spot color setting information is different from that of the first spot color setting information 101A registered in the user terminal 10, by performing external communication. The second spot color setting information 141 indicates spot color setting information other than that of the first spot color setting information 101A stored in the storage 14 of the user terminal 10 and is registered in the external device 40 by associating the shape of an object and a spot color with each other.

In step S305, the CPU 11 searches for objects indicated by the image data 200.

In step S306, the CPU 11 judges whether an object which is likely to be replaced by a spot color is included in the objects searched in step S305. For example, if the searched objects include an object whose shape matches the shape of an object registered in the first spot color setting information 101A or the second spot color setting information 141, the CPU 11 determines that an object which is likely to be replaced by a spot color, such as the object 201 (hereinafter such an object will be called a spot-color-replacing target object), is included. Conversely, if the searched objects do not include any object whose shape matches the shape of an object registered in the first spot color setting information 101A or the second spot color setting information 141, the CPU 11 determines that no spot-color-replacing target object is included in the searched objects.

If a spot-color-replacing target object is found (YES in step S306), the CPU 11 displays the above-described check screen on the display 16 in step S307. It is assumed that, in this example, the object 201 indicated by the image data 200 shown in FIG. 4 is found as a spot-color-replacing target object in step S306. The check screen is a screen for checking with the user regarding whether to replace the color of a spot-color-replacing target object (object 201, in this example) by a spot color. On the check screen, the object 201 is surrounded by the FIG. 202 defined by the broken lines (see FIG. 4), for example, and the spot color which replaces the color of the object 201 is displayed together with the object 201.

If no spot-color-replacing target object is found (NO in step S306), in step S310, the CPU 11 applies a standard color to the color of the object indicated by the image data, as in the print settings, and outputs print data reflecting the color of the object set to the standard color as in the print settings.

After step S307, the CPU 11 judges in step S308 whether a spot color is set for the color of the object 201 indicated by the image data 200. For example, if, on the check screen, the user has performed an input operation for replacing the color of the object 201 by the spot color, the CPU 11 determines that a spot color is set for the color of the object 201. If, on the check screen, the user has performed an input operation for not replacing the color of the object 201 by the spot color, the CPU 11 determines that a spot color is not set for the color of the object 201.

If the spot color is set for the color of the object 201 (YES in step S308), the CPU 11 replaces the color of the object 201 by the spot color and creates print data reflecting the spot color of the object 201 in step S309.

If the spot color is not set for the color of the object 201 (NO in step S308), in step S310, the CPU 11 applies a standard color to the color of the object 201, as indicated in the print settings, and creates print data reflecting the standard color of the object 201 as in the print settings.

In step S311, the CPU 11 outputs the print data to the server 20. In one example, the CPU 11 outputs a print job including the print data and print settings to the server 20. Then, the print job is sent from the server 20 to the printer 30, and the printer 30 executes the print job, thereby forming an image corresponding to the print data on a recording medium.

In step S312, the CPU 11 associates the shape of the object, whose color is replaced by the spot color in step S309, with this spot color and registers them as the current spot color setting information. For example, this current spot color setting information is stored in the storage 14 as part of the first spot color setting information 101A. In this manner, the first spot color setting information 101A is updated and can be used for future image formation. The information processing executed by the user terminal 10 based on the information processing program has been completed.

By using the user terminal 10 and the information processing program, it is possible for a user to efficiently set a spot color for an object to be subjected to spot color printing, compared with the configuration in which a user is required to set a spot color for an object indicated by image data for each print job.

In the user terminal 10, the first spot color setting information 101A is stored in the storage 14. Storing the first spot color setting information 101A saves a user setting a spot color for the object 201 indicated by the image data 200 shown in FIG. 4, for example.

The user terminal 10 obtains the second spot color setting information 141 by performing external communication with the external device 40. The second spot color setting information 141 is updated by the external device 40 and the user terminal 10 is able to use the latest second spot color setting information 141, which is not stored in the user terminal 10.

In the user terminal 10, when a spot color is set for an object whose shape is not registered in the first spot color setting information 101A, the CPU 11 registers the shape of this object and the set spot color in association with each other in the first spot color setting information 101A. This will save a user setting a spot color for this object in another print job.

In the user terminal 10, the shape of an object registered in the first spot color setting information 101A is a shape selected from the shapes of national flags and company logomarks. This will save a user setting a spot color when printing an image including a national flag or a company logomark, which is likely to be printed with a spot color.

In the user terminal 10, before outputting print data, the CPU 11 causes the display 16 to display a check screen for checking with a user regarding whether to replace the color of an object (object 201 indicated by the image data 200, for example) by a spot color associated with an object whose shape is registered in the first spot color setting information 101A or the second spot color setting information 141. The check screen receives an input operation indicating whether to replace the color of an object (object 201, for example) by a spot color. This makes it less likely that the object 201 will be printed with a spot color that the user does not wish. For example, when the color of the object 201 is changed, it is less likely to print the object 201 with a spot color other than this changed color.

In the user terminal 10, when displaying the check screen, the CPU 11 causes the display 16 to display the object 201 and the spot color that replaces the color of the object 201. This makes it easy to check with the user regarding whether to set this spot color.

In the user terminal 10, if an input operation for replacing the color of an object by a spot color associated with the shape of an object registered in the first spot color setting information 101A or the second spot color setting information 141 is not received, the CPU 11 does not replace the color of the object by the spot color and instead applies a preset standard color to the color of the object. This makes it less likely to print the object with a spot color that the user does not wish.

[Others]

In the above-described exemplary embodiment, the user terminal 10 and the printer 30 are wirelessly connected to each other via the server 20. However, the disclosure is not restricted to this configuration. For example, the printer 30 may integrate the user terminal 10. In one example, the printer 30 may be formed as an image forming apparatus including: the user terminal 10 formed as an information processing device including a processor; and an image forming device that forms an image on a recording medium based on print data output from the information processing device.

In the exemplary embodiment, the user terminal 10 refers to the first spot color setting information 101A, for example, and if the shape of the object 201 indicated by the image data 200 included in a print job matches the shape of an object registered in the first spot color setting information 101A, the user terminal 10 displays the check screen for checking with a user regarding whether to replace the color of the object 201 by a corresponding spot color. However, the disclosure is not restricted to this configuration. For example, if the shape of the object 201 matches that of an object registered in the first spot color setting information 101A, for example, the user terminal 10 may omit to display the check screen and replace the color of the object 201 by the corresponding spot color and output print data reflecting the spot color of the object 201.

The above-described processing executed by the user terminal 10 and the printer 30 may be implemented by a dedicated hardware circuit. In this case, a single hardware unit may be used or plural hardware units may be used.

A program for operating the user terminal 10 and the printer 30 may be provided as a result of being recorded on a computer readable recording medium, such as a universal serial bus (USB) memory, a flexible disk, and a compact disc-read only memory (CD-ROM), or may be provided online via a network, such as the internet. The program recorded on a computer readable recording medium is typically transferred to a memory or a storage, for example, and is stored. The program may be provided as application software or be integrated into software of the user terminal 10 and that of the printer 30 as one function of such devices.

In the exemplary embodiment, the server 20 is used. However, the disclosure is not restricted to this configuration. For example, the user terminal 10 and the printer 30 may connect to each other by a wired medium without using the server 20. Alternatively, the user terminal 10 and the printer 30 may connect to each other via the server 20 that provides a cloud service.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

[Appendix]

(((1)))

An information processing device comprising:

at least one processor configured to:

refer to a spot color setting information, the spot color setting information being information generated by registering a shape of an object and a predetermined spot color in association with each other;

replace, if a shape of an object indicated by image data included in a print job matches a shape of an object registered in the spot color setting information, a color of the object indicated by the image data by a spot color associated with the matched shape of the object registered in the spot color setting information; and output print data reflecting the spot color of the object indicated by the image data.

(((2)))

The information processing device according to (((1))), further comprising:

a memory, wherein the spot color setting information is stored in the memory.

(((3)))

The information processing device according to (((1))), wherein the spot color setting information is obtained by external communication.

(((4)))

The information processing device according to (((2))) or (((3))), wherein the at least one processor is configured to:

when a spot color is set for an object whose shape is not registered in the spot color setting information, register the shape of the object and the set spot color in association with each other in the spot color setting information.

(((5)))

The information processing device according to one of (((1))) to (((4))), wherein the shape of the object registered in the spot color setting information is a shape selected from shapes of national flags and company logomarks.

(((6)))

The information processing device according to one of (((1))) to (((5))), wherein the at least one processor is configured to cause a display to display a screen before outputting the print data, the screen being a screen for receiving an input operation indicating whether to replace the color of the object indicated by the image data by the spot color associated with the matched shape of the object registered in the spot color setting information.

(((7)))

The information processing device according to (((6))), wherein the at least one processor is configured to cause the display to display, when displaying the screen, the object indicated by the image data and a spot color that replaces the color of the object, the spot color to be displayed on the display being the spot color associated with the matched shape of the object registered in the spot color setting information.

(((8)))

The information processing device according to (((6))) or (((7))), wherein the at least one processor is configured to:

if an input operation for replacing the color of the object indicated by the image data by the spot color associated with the matched shape of the object registered in the spot color setting information is not received, apply a preset standard color to the color of the object indicated by the image data without replacing the color of the object by the spot color associated with the matched shape of the object; and output print data reflecting the standard color of the object indicated by the image data.

(((9)))

An image forming apparatus comprising:

the information processing device according to one of (((1))) to (((8))); and an image forming device that forms an image on a recording medium based on print data output from the information processing device.

(((10)))

An information processing program for causing a computer to execute a process, the process comprising:

referring to a spot color setting information, the spot color setting information being information generated by registering a shape of an object and a predetermined spot color in association with each other;

replacing, if a shape of an object indicated by image data included in a print job matches a shape of an object registered in the spot color setting information, a color of the object indicated by the image data by a spot color associated with the matched shape of the object registered in the spot color setting information; and outputting print data reflecting the spot color of the object indicated by the image data.

What is claimed is:

1. An information processing device comprising:

at least one processor configured to:

refer to a spot color setting information, the spot color setting information being information generated by registering a shape of an object and a predetermined spot color in association with each other;

replace, if a shape of an object indicated by image data included in a print job matches a shape of an object registered in the spot color setting information, a color of the object indicated by the image data by a spot color associated with the matched shape of the object registered in the spot color setting information; and output print data reflecting the spot color of the object indicated by the image data.

2. The information processing device according to claim 1, further comprising:

a memory, wherein the spot color setting information is stored in the memory.

3. The information processing device according to claim 1, wherein the spot color setting information is obtained by external communication.

4. The information processing device according to claim 2, wherein the at least one processor is configured to:

when a spot color is set for an object whose shape is not registered in the spot color setting information, register the shape of the object and the set spot color in association with each other in the spot color setting information.

5. The information processing device according to claim 1, wherein the shape of the object registered in the spot color setting information is a shape selected from shapes of national flags and company logomarks.

6. The information processing device according to claim 1, wherein the at least one processor is configured to cause a display to display a screen before outputting the print data, the screen being a screen for receiving an input operation indicating whether to replace the color of the object indicated by the image data by the spot color associated with the matched shape of the object registered in the spot color setting information.

7. The information processing device according to claim 6, wherein the at least one processor is configured to cause the display to display, when displaying the screen, the object indicated by the image data and a spot color that replaces the color of the object, the spot color to be displayed on the display being the spot color associated with the matched shape of the object registered in the spot color setting information.

8. The information processing device according to claim 6, wherein the at least one processor is configured to:

if an input operation for replacing the color of the object indicated by the image data by the spot color associated with the matched shape of the object registered in the spot color setting information is not received, apply a preset standard color to the color of the object indicated by the image data without replacing the color of the object by the spot color associated with the matched shape of the object; and output print data reflecting the standard color of the object indicated by the image data.

9. An image forming apparatus comprising:
the information processing device according to claim 1; and
an image forming device that forms an image on a recording medium based on print data output from the information processing device.

10. An image forming apparatus comprising:
the information processing device according to claim 2; and
an image forming device that forms an image on a recording medium based on print data output from the information processing device.

11. An image forming apparatus comprising:
the information processing device according to claim 3; and
an image forming device that forms an image on a recording medium based on print data output from the information processing device.

12. An image forming apparatus comprising:
the information processing device according to claim 4; and
an image forming device that forms an image on a recording medium based on print data output from the information processing device.

13. An image forming apparatus comprising:
the information processing device according to claim 5; and
an image forming device that forms an image on a recording medium based on print data output from the information processing device.

14. An image forming apparatus comprising:
the information processing device according to claim 6; and an image forming device that forms an image on a recording medium based on print data output from the information processing device.

15. An image forming apparatus comprising:
the information processing device according to claim 7; and
an image forming device that forms an image on a recording medium based on print data output from the information processing device.

16. An image forming apparatus comprising:
the information processing device according to claim 8; and
an image forming device that forms an image on a recording medium based on print data output from the information processing device.

17. An information processing method comprising:
referring to a spot color setting information, the spot color setting information being information generated by registering a shape of an object and a predetermined spot color in association with each other;
replacing, if a shape of an object indicated by image data included in a print job matches a shape of an object registered in the spot color setting information, a color of the object indicated by the image data by a spot color associated with the matched shape of the object registered in the spot color setting information; and
outputting print data reflecting the spot color of the object indicated by the image data.

18. A non-transitory computer readable medium storing a program causing a computer to execute a process, the process comprising:
referring to a spot color setting information, the spot color setting information being information generated by registering a shape of an object and a predetermined spot color in association with each other;
replacing, if a shape of an object indicated by image data included in a print job matches a shape of an object registered in the spot color setting information, a color of the object indicated by the image data by a spot color associated with the matched shape of the object registered in the spot color setting information; and
outputting print data reflecting the spot color of the object indicated by the image data.

19. The information processing device according to claim 1, wherein
the spot color setting information includes (i) first spot color setting information of the predetermined spot colors registered in advance with the respective shape of the object and stored in advance in the information processing device and (ii) second spot color setting information of the predetermined spot colors registered in advance with the respective shape of the object and obtained by external communication.

* * * * *